US012052237B2

(12) United States Patent
Murata et al.

(10) Patent No.: US 12,052,237 B2
(45) Date of Patent: *Jul. 30, 2024

(54) DISPLAY SYSTEM, DISPLAY METHOD, AND RECORDING MEDIUM

(71) Applicant: SHARP KABUSHIKI KAISHA, Sakai (JP)

(72) Inventors: Shinsuke Murata, Sakai (JP); Yoshiaki Tanaka, Sakai (JP); Akinori Ohnishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,413

(22) Filed: May 19, 2023

(65) Prior Publication Data

US 2023/0291730 A1 Sep. 14, 2023

Related U.S. Application Data

(60) Continuation of application No. 17/978,297, filed on Nov. 1, 2022, now Pat. No. 11,695,756, which is a
(Continued)

(30) Foreign Application Priority Data

Jun. 28, 2019 (JP) .................. 2019-120741

(51) Int. Cl.
*G06F 21/57* (2013.01)
*H04L 9/40* (2022.01)

(52) U.S. Cl.
CPC .......... *H04L 63/0838* (2013.01); *G06F 21/57* (2013.01)

(58) Field of Classification Search
None
See application file for complete search history.

(56) References Cited

U.S. PATENT DOCUMENTS 9,565,175 B1 * 2/2017 Saylor .................. H04L 67/125
11,171,958 B1 * 11/2021 Davey ................. H04L 12/1822
(Continued)

FOREIGN PATENT DOCUMENTS

JP 2006-189945 A 7/2006

OTHER PUBLICATIONS

Notice of Allowance of U.S. Appl. No. 16/890,578 issued on Aug. 4, 2022.
(Continued)

*Primary Examiner* — Nelson S. Giddins
(74) *Attorney, Agent, or Firm* — ScienBiziP, P.C.

(57) ABSTRACT

In a display system according to the present disclosure, a server device includes an authentication processor that authenticates a user for use of a file, based on authentication information of the user input at a user terminal and an access information generator that generates first access information for accessing the file if the user is authenticated by the authentication processor for use of the file, and a display device includes a file acquirer that acquires the file from the server device, based on the first access information generated by the access information generator, and a display processor that displays the file acquired by the file acquirer, on the display.

7 Claims, 8 Drawing Sheets

Related U.S. Application Data division of application No. 16/890,578, filed on Jun. 2, 2020, now Pat. No. 11,522,852.

(56) References Cited

U.S. PATENT DOCUMENTS

| | | |
|---|---|---|
| 2013/0290416 A1 | 10/2013 | Nelson et al. |
| 2016/0050326 A1 | 2/2016 | Lee et al. |
| 2018/0309742 A1 | 10/2018 | Kato |
| 2020/0349543 A1* | 11/2020 | Gilbert ................. G06Q 50/26 |
| 2021/0365538 A1 | 11/2021 | Goodsitt et al. |

OTHER PUBLICATIONS

Non-Final Rejection of U.S. Appl. No. 16/890,578 issued on Apr. 28, 2022.
Notice of Allowance of U.S. Appl. No. 17/978,297 issued on Mar. 2, 2023.

* cited by examiner

| FILE ID | FILE NAME | FILE ACCESS INFORMATION |
|---|---|---|
| F001 | DOCUMENT 1 | https://server/db/F001 |
| F002 | DOCUMENT 2 | |
| ... | ... | |

| USER ID | PASSWORD | USER NAME | MAIL ADDRESS |
|---|---|---|---|
| U001 | PW001 | A | user1@mail.com |
| U002 | PW002 | B | user2@mail.com |
| ... | ... | ... | ... |

| QUEUE ID | FILE ACCESS INFORMATION |
|---|---|
| Q001 | https://server/db/F001 |
| | |

DISPLAY SYSTEM, DISPLAY METHOD, AND RECORDING MEDIUM

INCORPORATION BY REFERENCE

The present application is a continuation application of U.S. patent application Ser. No. 17/978,297, filed on Nov. 1, 2022, which is a divisional application of U.S. patent application Ser. No. 16/890,578, filed on Jun. 2, 2020, which claims priority from Japanese Application 2019-120741, the content of which is hereby incorporated by reference into this application.

The present disclosure relates to a display system, a display method, and a recording medium, by which it is possible to download a file to display the downloaded file on a display device.

BACKGROUND

There is known a display system in which a file stored in a file server is downloaded to a display device via a network such as the Internet to display the file on the display device. For example, a user acquires in advance a usage authority to use the file. The user having the usage authority inputs login information such as a user ID when using the file. The file server performs an authentication process of the user, based on the login information, and if the user is authenticated, transmits the file to the user terminal of the user. This allows the user to browse the file on the user terminal, for example.

If such a display system is applied to an electronic meeting and a display system such as an electronic bulletin board that presents information to a plurality of users, the following problems may possibly occur. For example, when a file is downloaded via a network to a display device such as a large electronic blackboard installed in a meeting room where an electronic meeting is held, a user performs a login operation of inputting login information (such as a user ID and a password) on a touch panel included in the display device. Operability of the login operation is not good for the user, and in particular, in a case of a large display device, the login information may possibly be leaked to other users.

SUMMARY

An object of the present disclosure is to provide a display system, a display method, and a recording medium, by which it is possible to prevent leakage of login information without reducing the operability of a login operation when a file is downloaded.

A display system according to an aspect of the present disclosure is a display system including a server device that manages a file, and a display device that includes a display and acquires the file from the server device to display the acquired file on the display, in which the server device includes: an authentication processor that authenticates a user for use of the file, based on authentication information of the user input at a user terminal; and an access information generator that generates first access information for accessing the file if the user is authenticated by the authentication processor for use of the file, and the display device includes: a file acquirer that acquires the file from the server device, based on the first access information generated by the access information generator; and a display processor that displays the file acquired by the file acquirer, on the display.

A display method according to another aspect of the present disclosure is a display method for displaying a file in a display system including a server device that manages the file, and a display device that includes a display and acquires the file from the server device to display the acquired file on the display, and the display method includes using one or more processors to execute: an authentication process for authenticating a user for use of the file, based on authentication information of the user input at a user terminal; an access information generation process for generating first access information for accessing the file if the user is authenticated for use of the file in the authentication process; a file acquisition process for acquiring the file from the server device, based on the first access information generated in the access information generation process; and a display process for displaying the file acquired in the file acquisition process, on the display.

A non-transitory recording medium for storing a display program according to another aspect of the present disclosure is a non-transitory recording medium for storing a display program for displaying a file in a display system including a server device that manages the file, and a display device that includes a display and acquires the file from the server device to display the acquired file on the display, in which the display program causes one or more processors to execute: an authentication process for authenticating a user for use of the file, based on authentication information of the user input at a user terminal; an access information generation process for generating first access information for accessing the file if the user is authenticated for use of the file in the authentication process; a file acquisition process for acquiring the file from the server device, based on the first access information generated in the access information generation process; and a display process for displaying the file acquired in the file acquisition process, on the display.

According to the present disclosure, there are provided a display system, a display method, and a recording medium, by which it is possible to prevent leakage of login information without reducing the operability of a login operation when a file is downloaded.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a table showing an example of file information used in the display system according to the embodiment of the present disclosure;

FIG. 3 is a table showing an example of user information used in the display system according to the embodiment of the present disclosure;

FIG. 4 is a table showing an example of an access information database included in the display system according to the embodiment of the present disclosure;

DETAILED DESCRIPTION

An embodiment of the present disclosure will be described below with reference to the accompanying drawings to facilitate understanding of the present disclosure. It is noted that the following embodiment is an example in which the present disclosure is embodied, and does not limit the technical scope of the present disclosure.

Display System 100

Figure 1:
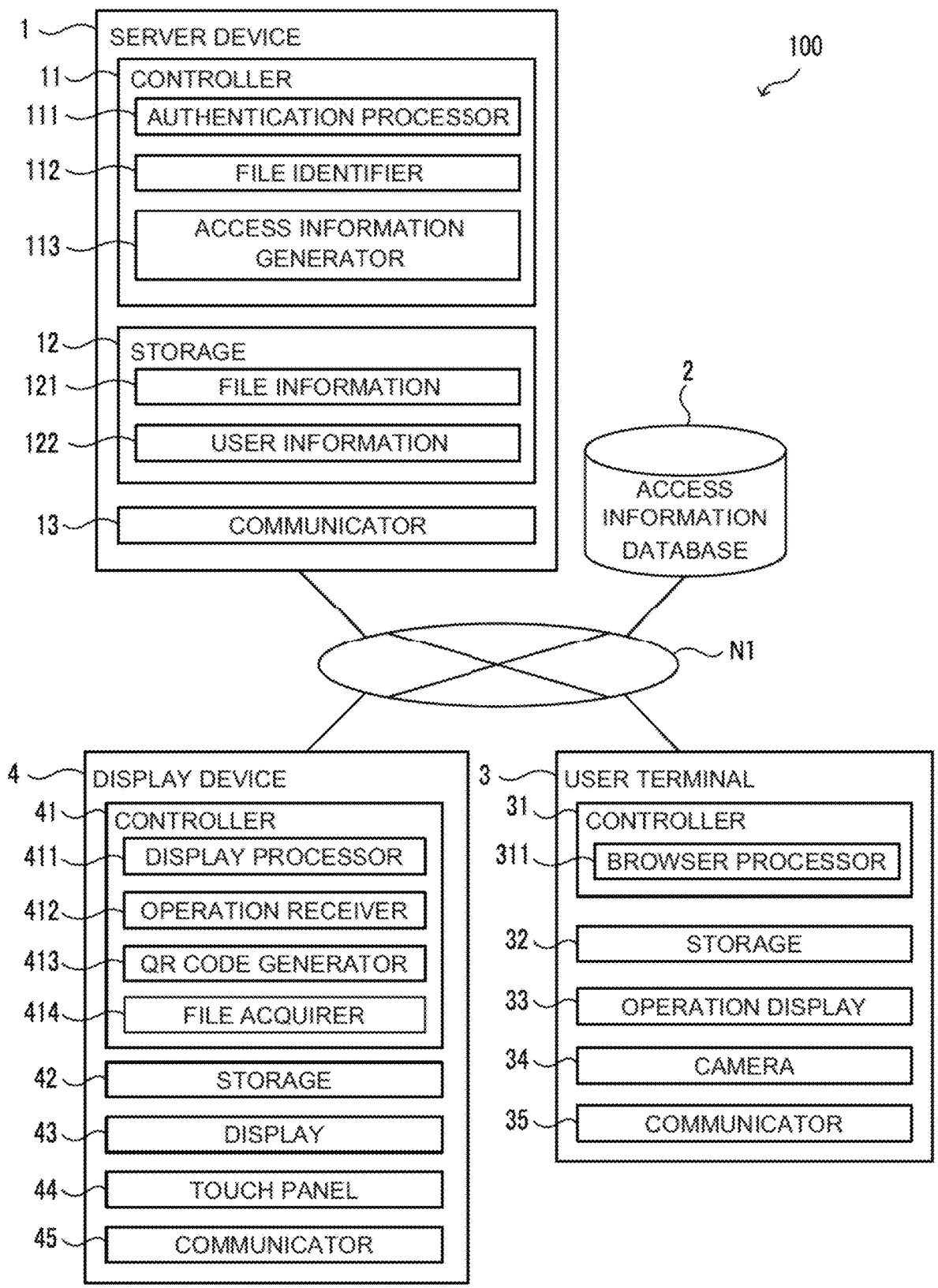
FIG. 1 is a block diagram illustrating a configuration of a display system according to an embodiment of the present disclosure.

As illustrated in FIG. 1, a display system 100 according to an embodiment of the present disclosure includes a server device 1 that manages a file, an access information database 2, a display device 4 that acquires the file from the server device 1 that displays the acquired file on a display 43, and one or a plurality of user terminals 3 possessed (carried) by a user using the file. The server device 1, the access information database 2, the display device 4, and each of the user terminals 3 are communicable via a communication network N1 such as the internet, LAN, WAN, or a public terminal line.

The display device 4 is an information processing device usable by a plurality of users and presents (displays) information to a plurality of users. For example, the display device 4 is used as an electronic blackboard (electronic board device) in an electronic meeting. In this case, the display device 4 is installed in a meeting room and is used by a plurality of users participating in a meeting. For example, the display device 4 displays a document used for the meeting or a website page via the Internet, based on a user operation.

The user terminal 3 is, for example, an information processing device possessed by a participant (user) participating in a meeting. The user terminal 3 is a mobile terminal such as a mobile phone, a smartphone, a tablet terminal, or a personal computer.

The server device 1 is an information processing device (file server) that stores and manages content data (hereinafter referred to as "file") such as a document, a video, and a sound. The access information database 2 is a database that stores file access information (link information) being information for accessing a file stored in the server device 1. The file access information is an example of first access information according to the present disclosure. The access information database 2 acquires, for example, the file access information transmitted from the user terminal 3 in the order of transmission and stores the acquired file access information into a storage area. The access information database 2 may be included in the server device 1.

In the present embodiment, the server device 1, the access information database 2, the display device 4, and the user terminal 3 correspond to a display system according to the present disclosure. The display system according to the present disclosure may be configured by the server device 1 and the display device 4.

Server Device 1

As illustrated in FIG. 1, the server device 1 includes a controller 11, a storage 12, a communicator 13, and the like. The server device 1 is a file server that stores and manages a file. The server device 1 may be, for example, one virtual server (cloud server) including a plurality of physical servers or one physical server.

The communicator 13 is a communication interface for connecting the server device 1 to the communication network N1 in a wired or wireless manner to execute data communication according to a predetermined communication protocol between the server device 1 and an external device such as the access information database 2, the user terminal 3, the display device 4 via the communication network N1.

The storage 12 is a non-volatile storage including a hard disk drive (HDD), or a solid state drive (SSD) that store various types of information. Specifically, the storage 12 stores data such as file information 121 for one or plurality of files and user information 122 for a user using the files. The storage 12 also stores data of one or plurality of files. FIG. 2 is a table showing an example of the file information 121, and FIG. 3 is a table showing an example of the user information 122.

As shown in FIG. 2, in the file information 121, information on a plurality of files is registered. A file name and file access information for accessing the file are associated for each of the files.

Specifically, the file information 121 includes information such as a "file ID", a "file name", and "file access information" for each of the files. The "file ID" is identification information for identifying a file. The "file name" is a name and the like of a file. The "file access information" is information for accessing a file, and is, for example, link information of the file. The file ID, the file name, and the file access information are associated for each of files stored in the storage 12. Data of each of the files is stored in the storage 12 if a user performs a predetermined operation (upload operation) on the user terminal 3, for example. Upon acquiring the file, the controller 11 generates a file ID, a file name, file access information, and the like and registers with the file information 121.

As shown in FIG. 3, the user information 122 includes information such as a "user ID", a "password", a "user name", and an "email address" for each user. The "user ID" and the "password" are identification information (an example of authentication information of the present disclosure) for identifying a user. The user ID and the password are used in an authentication process for authenticating a user for using the file. The "user name" is a user's name or the like. The "email address" is an email address set to the user terminal 3. The user terminal 3 is capable of transmitting and receiving an email with an external device such as the server device 1 by using the email address. The user information 122 is registered by the controller 11 if, for example, each user inputs various types of information to a registration screen for registering user information on the user terminal 3. For example, a participant participating in a meeting registers user information in advance before the meeting starts. A user registered with the user information 122 is granted a usage authority to use the file. A user with the usage authority is allowed to use the file if authenticated by a login operation (described later).

In another embodiment, some or all of the file information 121 and the user information 122 may be stored in another server accessible via the communication network N1 from the server device 1, the access information database 2, the user terminal 3, or the display device 4.

Further, the storage 12 stores therein a control program such as a display program for causing the controller 11 to execute a display process (see FIG. 11) described later. For example, the display program is recorded non-temporarily in a computer-readable recording medium such as a CD or a DVD, is read by a reading device (not illustrated) such as a CD drive or a DVD drive provided in the server device 1, and is stored in the storage 12.

The controller 11 includes a control device such as a CPU, a ROM, and a RAM. The CPU is a processor for executing various types of arithmetic processes. The ROM is a non-volatile storage in which a control program such as BIOS and OS for causing the CPU to execute various types of arithmetic processes is stored in advance. The RAM is a volatile or non-volatile storage that stores various types of information, and is used as a temporary storage memory (working area) for various types of processes executed by the CPU. The controller 11 controls the server device 1 by causing the CPU to execute various types of control programs stored in advance in the ROM or the storage 12.

Specifically, the controller 11 includes various types of process operators such as an authentication processor 111, a file identifier 112, and an access information generator 113, as illustrated in FIG. 1. The controller 11 functions as the various types of process operators by causing the CPU to execute various types of processes according to the display program. Moreover, some or all of the processing operators may be configured by an electronic circuit. The display program may be a program for causing a plurality of processors to function as the processing operator.

The authentication processor 111 authenticates a user for use of the file, based on a user ID and a password input on the user terminal 3. Specifically, the authentication processor 111 performs a login process and an authentication process for a user, based on a user ID and a password (login information) acquired from the user terminal 3.

For example, the controller 11 displays a login terminal selection screen (see FIG. 5) on the display 43 of the display device 4. On the login terminal selection screen, selection keys K1 and K2 for selecting a terminal used for a login process are displayed. Here, if a user selects the selection key K2 of the "display device", the authentication processor 111 displays a login screen for inputting a user ID and a password on the display 43 of the display device 4. If a user ID and a password are input to the login screen on the display device 4, the authentication processor 111 acquires the user ID and the password from the display device 4 to perform the authentication process. As described above, in this case, not only the operability of the login operation is poor for a user, but also the user ID and the password may possibly be leaked to other users. Therefore, in the present embodiment, a user is capable of selecting a login operation in which the user terminal 3 is used.

If a user selects the selection key K1 of the "user terminal", the authentication processor 111 acquires, from the user terminal 3, a user ID and a password input in the user terminal 3. For example, the user activates a predetermined application on the user terminal 3 and inputs the user ID and the password to the login screen displayed on the user terminal 3. If the user ID and the password are inputted to the login screen, the authentication processor 111 acquires the user ID and the password from the user terminal 3 to perform the authentication process. The user is capable of selecting the login operation in which the "display device" is used or the login operation in which the "user terminal" is used depending on a situation. In the present embodiment, the login operation in which the "user terminal" is used will be described.

Upon acquiring a user ID and a password from the user terminal 3, the authentication processor 111 determines whether the user ID and the password matching the acquired user ID and password registered with the user information 122 (see FIG. 3). The authentication processor 111 authenticates the user corresponding to the user ID if the user ID and the password acquired from the user terminal 3 are registered with the user information 122. The authentication processor 111 may authenticate the user corresponding to the user ID after performing a registration process of the user information if the user ID and the password acquired from the user terminal 3 are not registered with the user information 122. If the user is authenticated, the authentication processor 111 transmits information with an indication of the authentication, to the display device 4. The authentication processor 111 is an example of an authentication processor according to the present disclosure.

Figure 7:
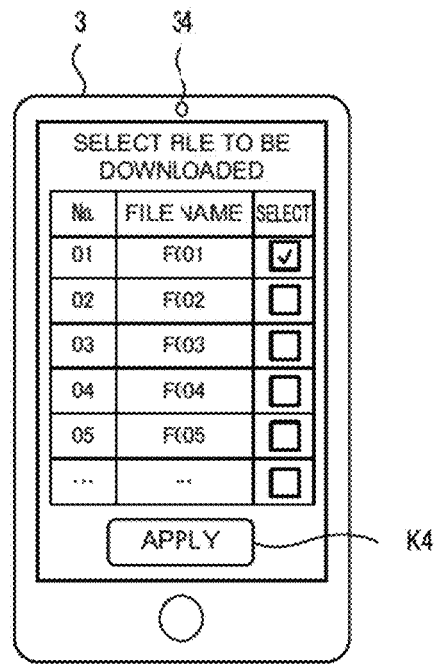
FIG. 7 is a diagram illustrating a display example in a user terminal of the display system according to the embodiment of the present disclosure.

The file identifier 112 transmits file information and data of a file selection screen to an email address of the user terminal 3 of the user if the user is authenticated by the authentication processor 111. The file information includes various types of information registered with the file information 121. On an operation display 33 of the user terminal 3, for example, as illustrated in FIG. 7, a file selection screen including a file list listing file information of a plurality of files registered with the file information 121 is displayed. The user selects a desired file on the file selection screen and depresses an apply key K4. In FIG. 7, a state where a file name "F001" is selected is illustrated. The user may select a plurality of files on the file selection screen. If at least one file is selected on the file selection screen, the file identifier 112 identifies the selected file, based on the operation information (selected file information) transmitted from the user terminal 3. Here, the file identifier 112 identifies the file having the file name "F001".

The access information generator 113 generates the file access information for accessing the file if the user is authenticated by the authentication processor 111 for the use of the file. Specifically, the access information generator 113 generates the file access information of the file identified by the file identifier 112. That is, the access information generator 113 generates the file access information corresponding to the file selected by the user at the user terminal 3, from among the plurality of files.

In the above example, the access information generator 113 generates, for example, the file access information "https://server/db/F001" corresponding to the file name "F001". After generating the file access information, the access information generator 113 transmits the file access information to the user terminal 3. Further, the access information generator 113 registers the file access information with the "file access information" of the file information 121. FIG. 2 illustrates a state in which the file access information "https://server/db/F001" corresponding to the file name "F001" is registered. In addition, if the file names "F001" and "F002" are identified by the file identifier 112, the access information generator 113 generates the file access information of the two files to be registered with the file information 121. The access information generator 113 is an example of an access information generator according to the present disclosure.

The controller 11 executes a process (download process described later) for transmitting the file selected by the user to the display device 4, based on an instruction of the user.

User Terminal 3

As illustrated in FIG. 1, the user terminal 3 includes a controller 31, a storage 32, the operation display 33, a camera 34, a communicator 35, and the like. The user terminal 3 is a mobile terminal such as a mobile phone, a smartphone, a tablet terminal, or a personal computer.

The communicator 35 is a communication interface for connecting the user terminal 3 to the communication network N1 in a wired or wireless manner to execute data communication according to a predetermined communication protocol between the user terminal 3 and an external device such as the server device 1, the access information database 2, and the display device 4 via the communication network N1.

Figure 6:
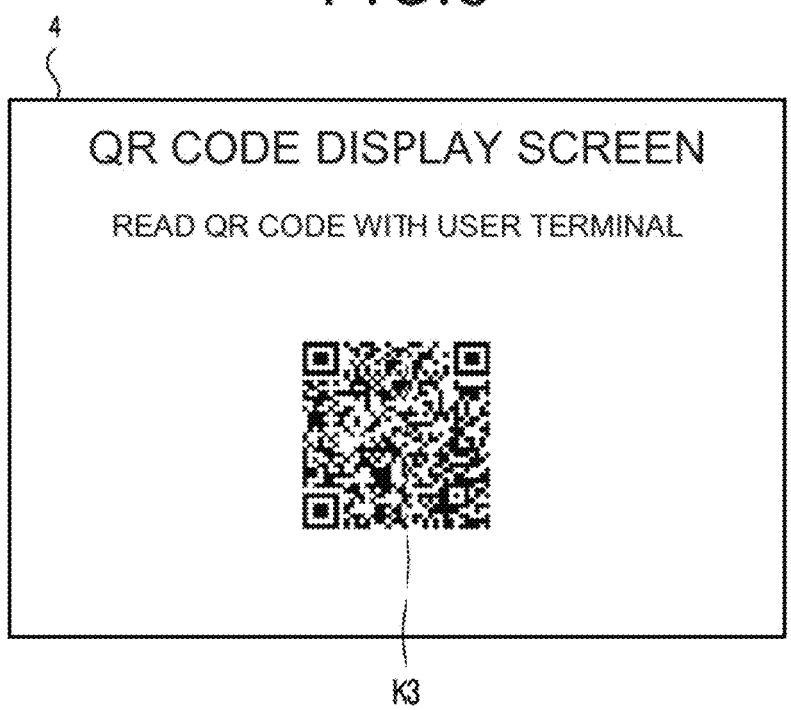
FIG. 6 is a diagram illustrating a display example in the display device of the display system according to the embodiment of the present disclosure.

The camera 34 is a digital camera that captures an image of a subject and outputs the image as digital image data. For example, the camera 34 is capable of capturing a QR code image K3 (see FIG. 6) of a QR code displayed on the display 43 of the display device 4. The QR code is an example of an information code according to the present disclosure. The information code according to the present disclosure may employ various types of one-dimensional code, two-dimensional code, and other identification marks. The QR code includes, for example, database access information (URL) being information for accessing a storage location of the file access information. The database access information is an example of second access information according to the present disclosure.

The operation display 33 is a user interface including a display such as a liquid crystal display or an organic EL display that displays various types of operation screens, a webpage, and the like, and an operation processor such as a mouse, a keyboard, or a touch panel that receives an operation.

The storage 32 is a non-volatile storage including a hard disk drive (HDD), a solid state drive (SSD), or a flash memory that stores various types of information. For example, the storage 32 stores a control program such as a browser program. Specifically, the browser program is a control program for causing the controller 31 to execute a communication process between the user terminal 3 and external devices such as the server device 1, the access information database 2, and the display device 4 according to a communication protocol such as Hypertext Transfer Protocol (HTTP). Further, the browser program may be a dedicated application for executing a communication process between the user terminal 3, and the server device 1 and the access information database 2 according to a predetermined communication protocol.

The controller 31 includes control devices such as a CPU, a ROM, and a RAM. The CPU is a processor for executing various types of arithmetic processes. The ROM is a non-volatile storage in which a control program such as BIOS and OS for causing the CPU to execute various types of processes is stored in advance. The RAM is a volatile or non-volatile storage that stores various types of information, and is used as a temporary storage memory (working area) for various types of processes executed by the CPU. The controller 31 then controls the user terminal 3 by causing the CPU to execute various types of control programs stored in advance in the ROM or the storage 32.

Specifically, the controller 31 functions as a browser processor 311 by executing various types of processes according to the browser program stored in the storage 32. For example, the browser processor 311 is capable of executing the browser process for displaying the file selection screen (see FIG. 7) transmitted via the communication network N1 from the server device 1, onto on the operation display 33 and inputting a file selection operation for the operation display 33, into the server device 1. That is, the user terminal 3 is capable of functioning as an operation terminal of the server device 1 as a result of the browser program being executed by the controller 31. Further, if a file is selected by a user on the operation display 33, the controller 31 transmits selected file information indicating information of the selected file to the server device 1. Some or all of the processing operators included in the controller 31 may be configured by an electronic circuit.

The controller 31 acquires the file access information from the server device 1. In the above example, the controller 31 acquires file access information "https://server/db/F001" with the file name "F001" from the server device 1.

The controller 31 reads the QR code, based on the QR code image K3 (see FIG. 6) captured by the camera 34 to acquire the database access information (URL) included in the QR code. Upon acquiring the database access information, the controller 31 transmits the file access information to a location corresponding to the database access information. Here, the controller 31 transmits the file access information "https://server/db/F001" to the access information database 2 being the location indicated by the database access information. If the file access information is acquired from the user terminal 3, the access information database 2 assigns identification information (a queue ID) to the file access information and stores the file access information in a predetermined storage area (see FIG. 4).

Display Device 4

As illustrated in FIG. 1, the display device 4 includes a controller 41, a storage 42, the display 43, a touch panel 44, a communicator 45, and the like. Here, the display device 4 is an electronic blackboard.

The communicator 45 is a communication interface for connecting the display device 4 to the communication network N1 in a wired or wireless manner to execute data communication according to a predetermined communication protocol between the display device 4 and an external device such as the server device 1, the access information database 2, and the user terminal 3 via the communication network N1.

The display 43 is a display that displays various types of information, and is, for example, a liquid crystal display. The display 43 is not limited to a liquid crystal display, and may be a light emitting diode (LED) display, an organic electroluminescence (EL) display, a projector, or the like.

The touch panel 44 may be a capacitive touch panel, or may be a pressure sensitive or an infrared scanning type touch panel. That is, the touch panel 44 may be any device capable of appropriately receiving a user operation input such as a touch. The display 43 and the touch panel 44 may be formed as one body.

The storage 42 is a non-volatile storage such as a hard disk drive (HDD) or a solid state drive (SSD) that stores various types of information. Specifically, the storage 42 stores data such as a file downloaded from the server device 1 and various types of screens transmitted from the server device 1.

The storage 42 stores a control program such as a display program for causing the controller 41 to execute a display process (see FIG. 11) described later. For example, the display program is recorded non-temporarily in a computer-readable recording medium such as a CD or a DVD, is read by a reading device (not illustrated) such as a CD drive or a DVD drive provided in the display device 4, and is stored in the storage 42.

The controller 41 includes control devices such as a CPU, a ROM, and a RAM. The CPU is a processor for executing various types of arithmetic processes. The ROM is a non-volatile storage in which a control program such as BIOS and OS for causing the CPU to execute various types of arithmetic processes is stored in advance. The RAM is a volatile or non-volatile storage that stores various types of information, and is used as a temporary storage memory (working area) for various types of processes executed by the CPU. The controller 41 controls the display device 4 by causing the CPU to execute various types of control programs stored in advance in the ROM or the storage 42.

Specifically, as illustrated in FIG. 1, the controller 41 includes various types of process operators such as a display processor 411, an operation receiver 412, a QR code generator 413, and a file acquirer 414. The controller 41 functions as the various types of process operators by causing the CPU to execute various types of processes according to the display program. Moreover, some or all of the processing operators may be configured by an electronic circuit. The display program may be a program for causing a plurality of processors to function as the processing operator.

Figure 9:
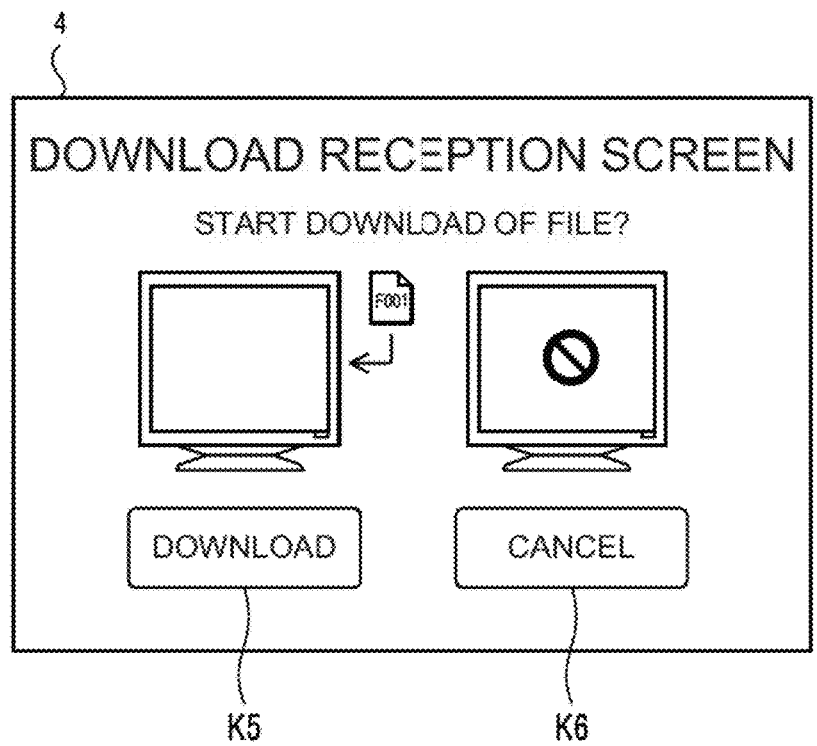
FIG. 9 is a diagram illustrating a display example in the display device of the display system according to the embodiment of the present disclosure.

The display processor 411 displays various types of information on the display 43. For example, the display processor 411 displays the login terminal selection screen (see FIG. 5), a download reception screen (see FIG. 9), and the like transmitted from the server device 1, on the display 43. The display processor 411 is an example of a display processor according to the present disclosure.

The operation receiver 412 receives a user operation. For example, the operation receiver 412 receives an operation of selecting a login terminal, from a user, on the login terminal selection screen (see FIG. 5). The operation receiver 412 transmits the received information to the server device 1. The operation receiver 412 receives an instruction to start downloading the file from the user, on the download reception screen (see FIG. 9). Upon receiving the instruction to start the download, the operation receiver 412 transmits information indicating the instruction, to the server device 1.

The QR code generator 413 generates a QR code including the database access information for accessing the access information database 2. For example, the QR code generator 413 generates a QR code if the "user terminal" is selected as the login terminal on the login terminal selection screen (see FIG. 5). If the QR code generator 413 generates the QR code, the display processor 411 displays the QR code image K3 (see FIG. 6) representing the generated QR code on the display 43. The QR code generator 413 is an example of an information code generator according to the present disclosure.

The file acquirer 414 acquires the file access information via the user terminal 3, and acquires the file from the server device 1, based on the acquired file access information. Specifically, if accepting the instruction to start downloading the file from the user on the download reception screen (see FIG. 9), the file acquirer 414 acquires the file from the server device 1, based on the file access information. For example, if accepting the instruction to start downloading the file with the file name "F001", the file acquirer 414 refers to the file access information "https://server/db/F001" to execute a download process of the file from the server device 1. If the file acquirer 414 acquires the file from the server device 1, the display processor 411 displays the file on the display 43 (see FIG. 10). The file acquirer 414 is an example of a file acquirer according to the present disclosure.

Figure 10:
FIG. 10 is a diagram illustrating a display example in the display device of the display system according to the embodiment of the present disclosure.

If the file is constituted of one page, the display processor 411 displays one sheet image on the display 43 (see FIG. 10). If the file is constituted of a plurality of pages, the display processor 411 displays a plurality of separate sheet images on the display 43. The display processor 411 may display and align a plurality of sheet images in a predetermined direction such as in an up-down direction and in a left-right direction, may display and align the plurality of sheet images in a front-rear direction to allow for a partial overlap, or may display in a list format the plurality of sheet images as a thumbnail image.

Display Process

A display process executed in the display system 100 will be described below. Specifically, in the present embodiment, the display process is executed by the controller 11 of the server device 1, the controller 31 of the user terminal 3, and the controller 41 of the display device 4. Further, the controllers 11, 31, and 41 execute the display process in response to a login operation from the user terminal 3.

The present disclosure may be regarded as an invention of a display method in which one or more steps included in the display process are executed. Further, one or more steps included in the display process described herein may be omitted where appropriate. In addition, each of the steps in the display process may be executed in a different order as long as a similar operation and effect is obtained. Further, although a case where each of the steps in the display process is executed by the controllers 11, 31, and 41 will be described as an example here, a display method in which each of the steps in the display process is executed in a distributed manner by a plurality of processors may be regarded as another embodiment.

Here, a first display process, a second display process, and a third display process are illustrated in specific examples of a display process executed in the display system 100. Display methods in which each of the first display process, the second display process, and the third display process is executed are examples of a display method according to the present disclosure.

First Display Process

Figure 11:
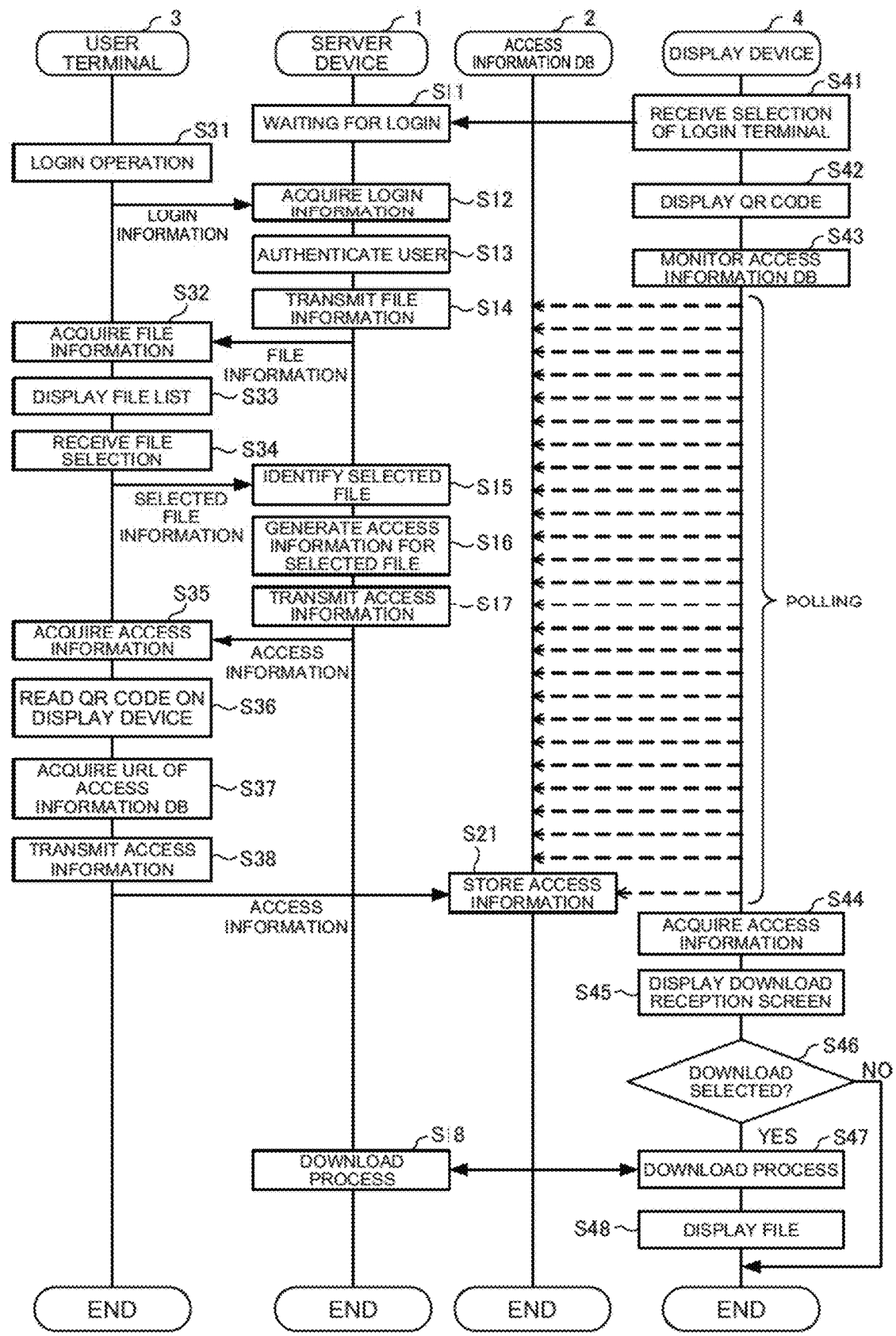
FIG. 11 is a flowchart illustrating an example of a first display process executed in the display system according to the embodiment of the present disclosure.

The first display process executed in the display system 100 will be described below with reference to FIG. 11. In a flowchart illustrated in FIG. 11, each step number is shown to correspond to each reference numeral of the server device 1, the access information database 2, the user terminal 3, and the display device 4.

Figure 5:
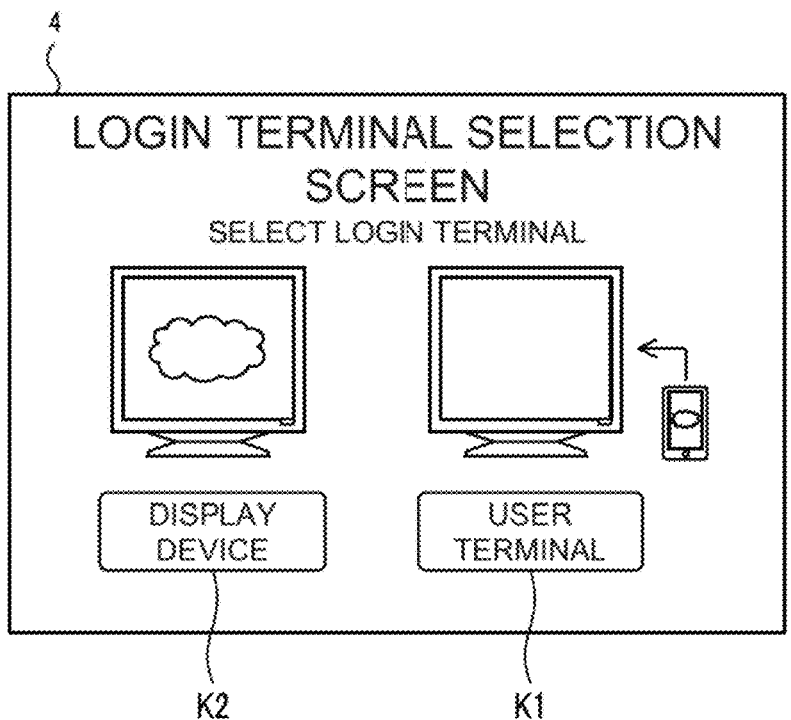
FIG. 5 is a diagram illustrating a display example in a display device of the display system according to the embodiment of the present disclosure.

First, in step S41, the controller 41 of the display device 4 receives an operation of selecting a login terminal from a user on the login terminal selection screen (see FIG. 5). Here, it is assumed that the user selects the selection key K1 of the "user terminal". The controller 41 transmits received information to the server device 1.

If the "user terminal" is selected as the login terminal, the controller 41 generates a QR code including database access information (URL) for accessing the access information database 2, and displays the QR code image K3 (see FIG. 6) on the display 43 (S42). Thereafter, the controller 41 monitors the access information database 2 (S43). Specifically, the controller 41 executes a polling process on the access information database 2 and repeatedly determines whether data (file access information) is stored in the access information database 2.

Next, in step S11, the controller 11 of the server device 1 waits for login information transmitted from the user terminal 3.

Next, in step S31, the controller 31 of the user terminal 3 receives a login operation from the user. Specifically, the controller 31 acquires login information (a user ID and a password) input at the user terminal 3. The controller 31 transmits the acquired login information to the server device 1.

Next, the controller 11 of the server device 1 acquires the login information from the user terminal 3 (S12) and authenticates the user, based on the user information 122 (see FIG. 3) (S13). Step S13 is an example of an authentication process according to the present disclosure. If the user is authenticated, the controller 11 transmits the file information of the plurality of files registered with the file information 121 (see FIG. 2) to the user terminal 3 (S14).

Next, in step S32, the controller 31 of the user terminal 3 acquires the file information from the server device 1. The controller 31 displays a file selection screen (see FIG. 7) including a file list on the operation display 33, based on the acquired file information (S33). Next, the controller 31 receives a file selection from the user on the file selection screen. Upon receiving the file selection from the user, the controller 31 transmits the selected file information to the server device 1 (S34).

Next, in step S15, upon acquiring the selected file information from the user terminal 3, the controller 11 of the server device 1 identifies the file selected by the user. Next, the controller 11 generates file access information corresponding to the selected file (S16). Step S16 is an example of an access information generation process according to the present disclosure. Next, the controller 11 transmits the generated file access information to the user terminal 3 (S17). The controller 11 registers the generated file access information with the file information 121 (see FIG. 2) in association with the selected file.

Figure 8:
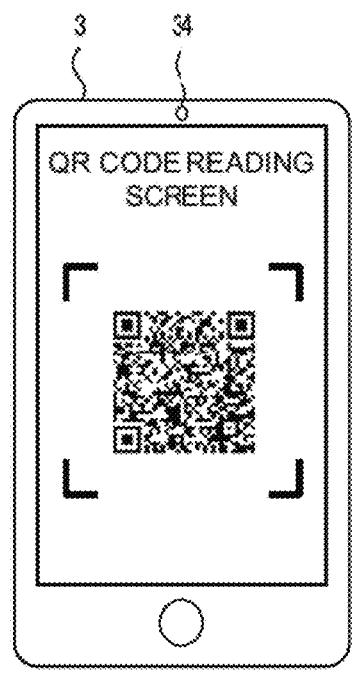
FIG. 8 is a diagram illustrating a display example in the user terminal of the display system according to the embodiment of the present disclosure.

Next, in step S35, the controller 31 of the user terminal 3 acquires the file access information from the server device 1. Next, the controller 31 reads the QR code image K3 displayed on the display device 4 (see FIG. 8) (S36) and acquires the database access information (URL) included in the QR code (S37). The controller 31 transmits the file access information to the access information database 2 identified by the database access information (URL) (S38).

Next, in step S21, upon acquiring the file access information from the user terminal 3, the access information database 2 assigns identification information (queue ID) to the file access information and stores the file access information in a predetermined storage area (see FIG. 4).

If the file access information is stored in the access information database 2, the controller 41 of the display device 4 recognizes the file access information by the polling process and acquires the file access information from the access information database 2 (S44). Next, the controller 41 displays the download reception screen (see FIG. 9) on the display 43 (S45) and receives an instruction to start downloading the file from the user (S46).

Upon receiving the instruction to start downloading the file from the user (S46: YES), the controller 41 transmits a download request for the file corresponding to the file access information, to the server device 1 (S47). Upon acquiring the download request from the display device 4, the controller 11 of the server device 1 transmits the file to the display device 4 (S18). Upon acquiring the file from the server device 1, the controller 41 of the display device 4 displays the acquired file on the display 43 (S48) (see FIG. 10). Step S47 is an example of a file acquisition process according to the present disclosure, and step S48 is an example of a display process according to the present disclosure.

As described above, in the first display process, the display device 4 displays the QR code including the database access information (URL) indicating a location of the access information database 2, on the display 43, and the user terminal 3 reads the QR code to acquire the database access information and transmits the file access information acquired from the server device 1 to the access information database 2. If the file access information (link information) is stored in the access information database 2, the display device 4 downloads the file from the server device 1, based on the file access information, and displays the downloaded file on the display 43.

Second Display Process

Figure 12:
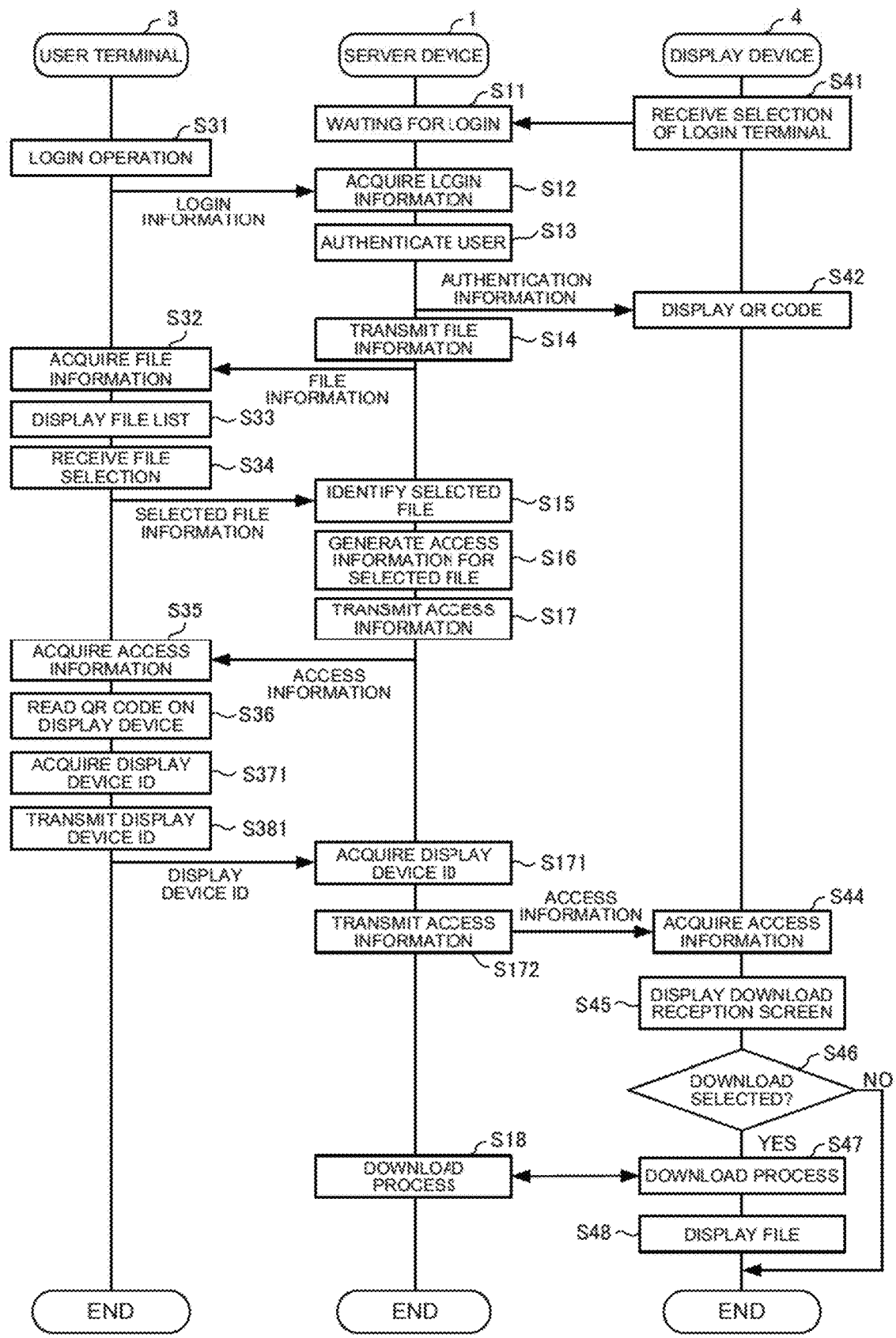
FIG. 12 is a flowchart illustrating an example of a second display process executed in the display system according to the embodiment of the present disclosure.

The second display process executed in the display system 100 will be described below with reference to FIG. 12. Here, a process different from the first display process illustrated in FIG. 11 will be described, and description of the same process as the first display process will be omitted.

In the display system 100 for executing the second display process, the access information database 2 is omitted. Therefore, in the second display process, the controller 41 of the display device 4 does not perform the polling process, and step S43 in the first display process is omitted.

In the second display process, in step S42, the controller 41 of the display device 4 generates a QR code including identification information (a display device ID) (for example, an IP address) of the display device 4, and displays the QR code image K3 on the display 43.

The controller 31 of the user terminal 3 reads the QR code image K3 displayed on the display device 4 (S36) and acquires the display device ID (S371). The controller 31 transmits the display device ID to the server device 1 (S381). The controller 31 may transmit the file access information (S35) acquired from the server device 1 to the server device 1 in association with the display device ID.

Upon acquiring the display device ID from the user terminal 3 (S171), the controller 11 of the server device 1 transmits the file access information to the display device 4 corresponding to the display device ID (S172). The controller 11 may transmit the file access information generated in step S16 to the display device 4, or may transmit the file access information acquired from the user terminal 3 to the display device 4.

Upon acquiring the file access information from the server device 1 (S44), the controller 41 of the display device 4 displays the download reception screen (see FIG. 9) on the display 43 (S45) and receives an instruction to start downloading the file from the user (S46).

Upon receiving the instruction to start downloading the file from the user (S46: YES), the controller 41 transmits a download request for the file corresponding to the file access information, to the server device 1 (S47). Upon acquiring the download request from the display device 4, the controller 11 of the server device 1 transmits the file to the display device 4 (S18). Upon acquiring the file from the server device 1, the controller 41 of the display device 4 displays the acquired file on the display 43 (S48) (see FIG. 10).

As described above, in the second display process, the display device 4 displays the QR code including the identification information (a display device ID) (an IP address) of the display device 4 on the display 43, and the user terminal 3 reads the QR code to acquire the display device ID, and transmits the display device ID to the server device 1. The server device 1 transmits the file to the display device 4 corresponding to the display device ID, and the display device 4 downloads the file to be displayed on the display 43.

The display system 100 for executing the second display process is realized by, for example, the following configuration. The display device 4 includes a QR code generator that generates a QR code including identification information (a display device ID) of the display device 4. The display processor 411 of the display device 4 displays the QR code generated by the QR code generator on the display 43. The user terminal 3 acquires the identification information by reading the QR code displayed on the display 43, and transmits the acquired identification information to the server device 1. The access information generator 113 of the server device 1 transmits file access information to the display device 4, based on the identification information acquired from the user terminal 3. The file acquirer 414 of the display device 4 acquires the file access information from the server device 1, and acquires the file from the server device 1, based on the acquired file access information.

Third Display Process

Figure 13:
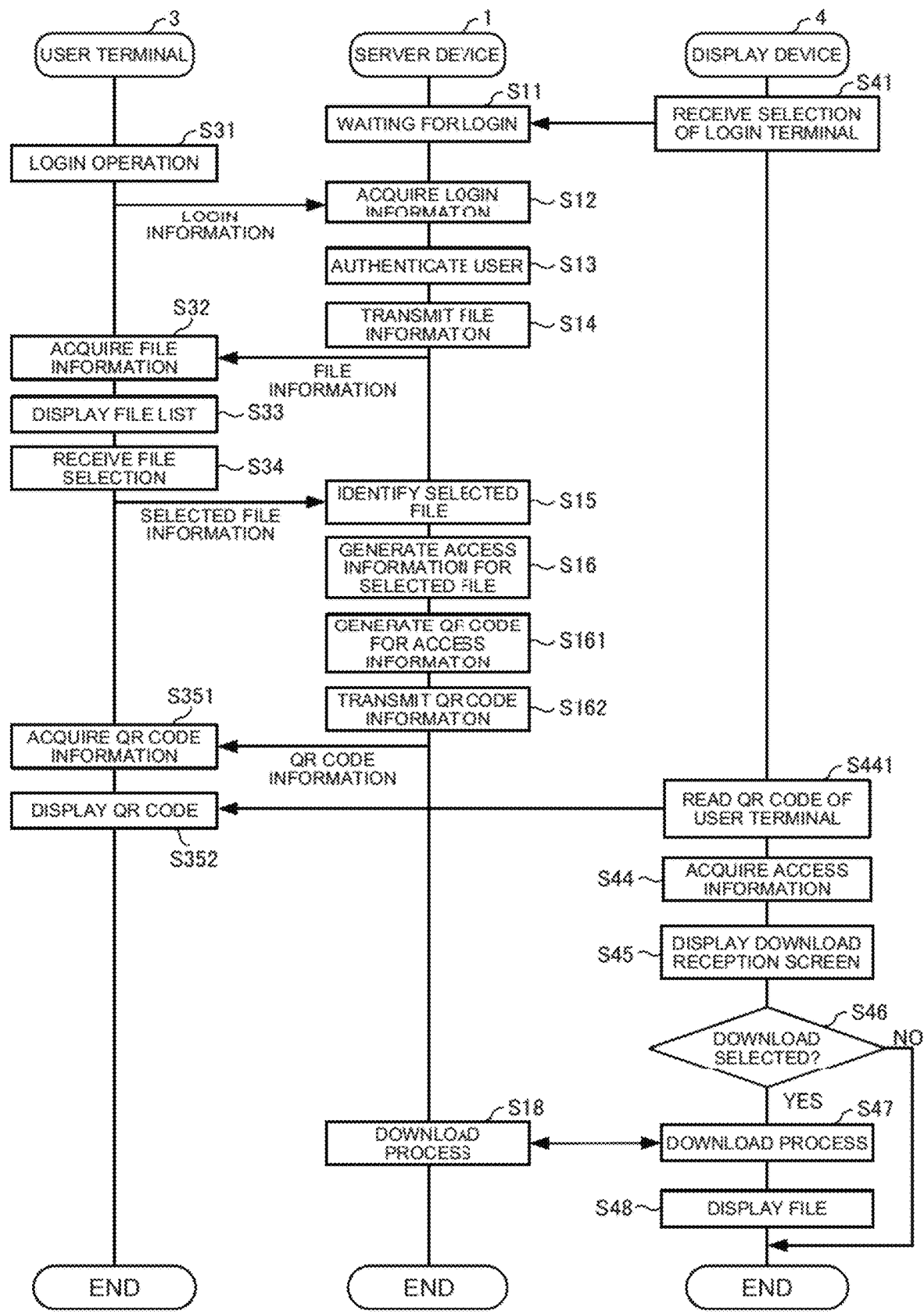
FIG. 13 is a flowchart illustrating an example of a third display process executed in the display system according to the embodiment of the present disclosure.

The third display process executed in the display system 100 will be described below with reference to FIG. 13. In this case also, a process different from the first display process illustrated in FIG. 11 will be described, and description of the same process as the first display process will be omitted.

Similarly to the display system 100 for executing the second display process, the access information database 2 is omitted in the display system 100 for executing the third display process. Therefore, in the third display process, the controller 41 of the display device 4 does not perform the polling process, and step S43 in the first display process is omitted.

In the third display process, if the controller 11 of the server device 1 generates the file access information corresponding to the file selected by the user (S16), the controller 11 of the server device 1 generates the QR code including the file access information (S161), and transmits the QR code information to the user terminal 3 (S162).

Upon acquiring the QR code information from the server device 1 (S351), the controller 31 of the user terminal 3 displays a QR code image on the operation display 33 (S352).

If the user places the QR code image displayed on the user terminal 3 over a reader (not illustrated) of the display device 4, the controller 41 of the display device 4 reads the QR code (S441) to acquire the file access information (link information) (S44). Next, the controller 41 displays the download reception screen (see FIG. 9) on the display 43 (S45) and receives an instruction to start downloading the file from the user (S46).

Upon receiving the instruction to start downloading the file from the user (S46: YES), the controller 41 transmits a download request for the file corresponding to the file access information, to the server device 1 (S47). Upon acquiring the download request from the display device 4, the controller 11 of the server device 1 transmits the file to the display device 4 (S18). Upon acquiring the file from the server device 1, the controller 41 of the display device 4 displays the acquired file on the display 43 (S48) (see FIG. 10).

As described above, in the third display process, the user terminal 3 displays a QR code including the file access information generated by the server device 1, and the display device 4 reads the QR code to acquire the file access information. Based on the file access information, the display device 4 downloads the file from the server device 1 and displays the downloaded file on the display 43.

The display system 100 for executing the third display process is realized by the following configuration, for example. The server device 1 includes a QR code generator that generates a QR code including file access information and transmits the generated QR code information to the user terminal 3. The user terminal 3 displays the QR code generated by the QR code generator. The file acquirer 414 of the display device 4 acquires the file access information by reading the QR code displayed on the user terminal 3, and acquires the file from the server device 1, based on the acquired file access information.

As described above, in the display system 100 according to the present embodiment, the server device 1 authenticates the user for use of the file, based on the user authentication information input at the user terminal 3, and if the user is authenticated, generates the file access information (first access information) for accessing the file. The display device 4 acquires the file from the server device 1, based on the file access information generated by the server device 1, and displays the file on the display 43. As described above, the user inputs the authentication information (login information) into the mobile terminal of the user without inputting the authentication information into the display device 4, and therefore, it is possible to improve the operability of the authentication operation and also possible to prevent the authentication information from being leaked to other uses. The authentication process is performed by the server device 1 that manages the file, and the authentication information is not exchanged between the display device 4 and the user terminal 3, and thus, it is possible to prevent the authentication information from being leaked via the display device 4. The display device 4 is capable of acquiring the file selected by the user simply by accessing the file access information (link information), and thus, it is possible to reduce communication frequency and to simplify a system configuration.

It is noted that, in the display system 100 according to the present disclosure, within the scope of the invention described in claims, the embodiments described above may be freely combined, or the embodiments may be appropriately modified or some of the embodiments may be omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus for acquiring a file from a server device and causing a display portion to display the file, the information processing apparatus comprising a processor configured to:
   cause the display portion to display an information code including identification information of the information processing apparatus;
   acquire access information for accessing the file from the server device when a mobile terminal of a user reads the information code displayed on the display portion and transmits the identification information of the information processing apparatus to the server device;
   cause the display portion to display a download reception screen for the file; and
   upon receiving an instruction to start downloading the file from the user on the download reception screen, acquire the file from the server device based on the access information and cause the display portion to display the acquired file.

2. The information processing apparatus according to claim 1, wherein
   the processor further causes the display portion to display the download reception screen when the processor acquires the access information from the server device.

3. The information processing apparatus according to claim 1, wherein the processor further generates the information code and causes the display portion to display the generated information code when the server device authenticates the user for use of the file based on authentication information of the user input to the mobile terminal.

4. The information processing apparatus according to claim 1, wherein
   the server device stores a plurality of files, including the file, and generates the access information for accessing a file selected on the mobile terminal from the plurality of files.

5. The information processing apparatus according to claim 1, wherein the server device generates the access information when the server device authenticates the user for use of the file based on authentication information of the user input to the mobile terminal.

6. An information processing method for acquiring a file from a server device and causing a display portion to display the file, the method comprising:
   causing the display portion to display an information code including identification information of the information processing apparatus;
   acquiring access information for accessing the file from the server device when a mobile terminal of a user reads the information code displayed on the display portion and transmits the identification information of the information processing apparatus to the server device;
   causing the display portion to display a download reception screen for the file; and
   upon receiving an instruction to start downloading the file from the user on the download reception screen, acquiring the file from the server device based on the access information and causing the display portion to display the acquired file.

7. A non-transitory computer-readable recording medium recording thereon a display program, including one or more instructions, for acquiring a file from a server device and causing a display portion to display the file, wherein the one or more instructions, when executed by one or more processors, cause the one or more processors to:
   cause the display portion to display an information code including identification information of the information processing apparatus;
   acquire access information for accessing the file from the server device when a mobile terminal of a user reads the information code displayed on the display portion and transmits the identification information of the information processing apparatus to the server device;
   cause the display portion to display a download reception screen for the file; and
   upon receiving an instruction to start downloading the file from the user on the download reception screen, acquire the file from the server device based on the access information and cause the display portion to display the acquired file.

* * * * *